Feb. 7, 1956     L. T. ALTSCHUL     2,733,747
FLEXIBLE AUTOMOBILE BODY COVER
Filed July 14, 1951

INVENTOR.
Louis T. Altschul
BY
Att'y

United States Patent Office 2,733,747
Patented Feb. 7, 1956

2,733,747

FLEXIBLE AUTOMOBILE BODY COVER

Louis T. Altschul, Chicago, Ill.

Application July 14, 1951, Serial No. 236,739

5 Claims. (Cl. 150—52)

The present invention relates to a flexible cover for the bodies of automobiles, which may be applied to and removed from an automobile body with ease and rapidity, which is simple and inexpensive to manufacture, and the structural arrangement of which provides in a novel manner for use of a single size of cover on a large variety of different makes, models and body styles of automobiles, with adequate covering of each and with reasonably neat draping and fit, but without requiring use of excessive quantities of material in the cover.

There are many makes and models of automobiles in current use, as well as in current production, and the various makes and models have bodies of markedly varying shapes and characters. All automobile bodies, however, have certain common structural arrangements, such as a passenger enclosure, a decked extension ahead of the passenger enclosure and that is of markedly less height to permit vision over it, and forward and rear right and left fender or mudguard structures. With the exception of panel trucks and station wagon bodies, for many years past automobile bodies have included a rear decked structure, that ranges in size and shape from a small box trunk, through a box type arrangement that practically duplicates the front motor housing, to a sweep type structure that merges with the passenger compartment top and curves smoothly and continuously down to the rear lower body margin. These general body resemblances are found in convertible automobile bodies, with tops erected, as well as in bodies providing permanently enclosed passenger compartments, as two and four door sedans, coupes and all variations of each.

Many makes and models of automobile bodies have maximum dimensions of overall length and width, passenger enclosure height, maximum length and height of a longer and higher decked front or rear extension, as an engine hood, lying within reasonably small ranges.

There has appeared on the market an automobile body cover that is made up of three panels. The first comprises top and end walls, is straight sided and materially narrower than the average overall width of automobile bodies, which is due to widths in which suitable material is produced commercially. Assembled with this straight-sided panel are a pair of side panels, each having one straight edge and a smoothly curving opposite edge providing a panel shape to mask the lateral profile of a large automobile body and overlap it sufficiently to permit the side panels to extend about the upper and the fore and aft vertical corners and lie alongside the edges of the narrow top panel to the edges of which the curved side panel edges are secured. The lower edge of the cover is encircled by an elastic. The commercial structure provides a sort of bag of somewhat curved top. When applied to an automobile body, due to extension of the side panel about the body corners, the cover drapes very badly, providing an extremely ill fit for many body types and sizes, and with many of them pulling the lower edge into such formation that the body cannot be fully covered.

By employment of the present invention, a single size cover can be made that will fit a very large range of body types, styles and sizes with sufficient accuracy to ensure complete coverage, and sufficient security to prevent accidental displacement. Excluding "midget" or "half-sized" automobiles, and possibly certain special purpose bodies, a cover provided with the dimensions hereinafter disclosed, and constructed in accordance with the principles of the invention will adequately cover and attach to all current stock model passenger automobile bodies manufactured in the United States, with the single exception of one largest model of an expensive luxury type automobile.

Figure 1:
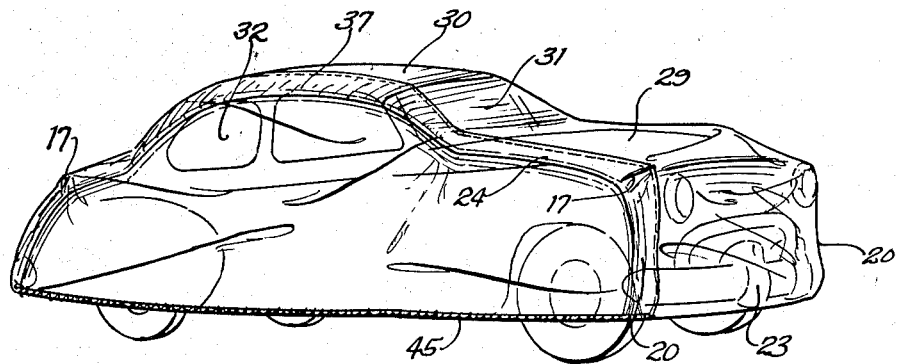
Fig. 1 is a perspective view of a typical automobile having its body enclosed by a cover arranged according to the invention.

It will be evident from consideration of Fig. 1 and from automobile body structures in general, that an automobile body is generally rectangular in plan, that it has a maximum overall length, generally defined between foremost and rearmost bumper surfaces, an overall maximum width that generally is defined between outermost lateral surfaces of laterally opposite fenders, an overall maximum height generally defined between the lower lateral body margin and the top of the passenger enclosure, a maximum fender height between a lower margin and topmost surface of a fender, and a maximum length between foremost and rearmost surfaces of fenders at the same side of the car. Additionally an automobile body provides a maximum length of a forward or rear decked extension from the passenger compartment, as an engine hood, and a maximum height of the same. The present invention is based on the perception that in practically all stock model automobile bodies, produced for many years past as well as current models, the ranges of variation of these various dimensions are of the order of inches in extent. The cover herein disclosed is made adaptable to a large range of automobile body sizes by sizing it in various dimensions to accommodate an automobile body of which the principal dimensions set forth above have assumed maximum lengths, hereinafter referred to as "assumed maximum" dimensions.

A primary feature of the invention resides in provision of a structure for secure and accurate hanging of four corner parts of the cover on the four fenders of an automobile body, so that by correct dimensioning of the skirt portion that depends below the points of cover suspension on the fenders, a very fair registration may be made between the lower margin of the cover and the lower car body margin. Suspension on the fenders is provided for as follows.

A straight and parallel-sided top panel 5 is provided. Plastic material suitable for use in this type cover, advantageously the highly plasticized vinyl acetate and chloride copolymer thin sheet that is commonly used in automobile covers as well as in many household and clothing articles, is not commercially available in strip widths corresponding to a reasonable limit of maximum automobile body overall width, say of seventy-two inches, the next narrower width being fifty-four inches, and the next wider involving unacceptable waste in cutting. Consequently the narrower width is employed in the cover of the present invention, as in prior covers, but in the present cover advantage is taken of it to provide the suspension referred to above.

Each side panel strip 6, 7 has a free edge 8 that includes a central reach 9 that is cut on a straight line, and that extends between end points 10 that are spaced apart a distance that exceeds the assumed maximum dimension between foremost and rearmost fender surfaces selected for bodies to which the cover is to be applicable, say two hundred sixteen inches, by the length by which the assumed maximum dimension of overall width between outermost lateral surfaces of opposite fenders selected for the cover, say seventy-two inches, exceeds the width of top panel 5. In the dimensions given, by way of example, this excess length, hereinafter termed "predetermined length" would be eighteen inches, giving central reaches 9 a total length of two hundred thirty-four inches.

Each side panel 6, 7 has adjacent each of its ends a first suspension pocket-forming edge 11. These edges 11 of each panel have inner ends that are spaced apart, in the direction parallel to the line on which reach 9 is cut, a distance equal to the assumed maximum dimension of length between front and rear fender surfaces, two hundred sixteen inches in the chosen example, and edges 11 are cut on a line disposed substantially parallel to the line on which reach 9 is cut and spaced therefrom by a distance corresponding substantially to the assumed maximum dimension of fender height, say thirty-six inches. From the inner ends of edges 11, second pocket-forming edges 12 extend, these being equal in length to edges 11 and cut on straight lines disposed at right angles to the lines on which edges 11 are cut. Edges 11, 12 are substantially equal in length to one-half of the difference between the width of center panel 5 and the assumed maximum dimension of automobile body width. In manufacture, the adjacent pairs of edges 11, 12 are secured together, as by suitable stitched seams, thereby forming pockets each of which is defined between three side panel portions, a side portion at 14, an end portion at 15, and a top portion at 16. The seams 17 (Fig. 1) of each panel 6, 7 by means of which edges 11, 12 are secured together, are spaced apart longitudinally of the panel at the assumed maximum dimension of fore and after fender surface spacing, and they are spaced above the free edge central reach 9 by the assumed maximum dimension of fender height when the side panel 6 or 7 is suspended by the seams in fully extended condition.

Beyond the ends 10 of the straight central reach 9 of free edge 8, the latter edge has end reaches 18, these are each of a length approximately equal to one-half the difference between the assumed maximum dimension of overall length, say of two hundred thirty-four inches and the length of reach 9, indicated in the example as two hundred sixteen inches, and the latter exceeding the assumed maximum dimension of spacing between fore and aft fender surfaces by the assumed maximum length by which the selected width dimension exceeds the width of top panel 5. Panel end edges 19 extend between the outer ends of pocket-forming edges 11 and the outer ends of end reaches 18 of free edge 8.

It will be seen that the securement together of the pocket-forming edges 11, 12 by seams 17 tends to form end portions 20 of side panels 6, 7, generally defined by the dotted lines 21 shown on panel 7, which form parts of cover and walls. The end edges 19 of these side panel portions 20 lie alongside and are secured to opposite edges 22 of end wall-forming portions 23 of top panel 5. Since center reaches 9 of the lower or free edges of panels 6, 7 exceed the assumed maximum dimension of spacing between forwardmost and rearwardmost fender surfaces of automobile bodies to be covered, the distance of that excess being the preselected length by which the width of top panel 5 is exceeded by the maximum assumed dimension of width of such bodies, the end walls formed by panel portions 20, 23, 20 are wide enough to extend across the end surfaces of such automobile bodies. The excess length of side panel free edges 8 provided by the extreme end or terminal reaches, is approximately equal to the difference between the assumed maximum dimensions of overall body length and length of spacing between the forwardmost and rearwardmost fender surfaces, and is to accommodate such projections ahead or to the rear of the fender surfaces, as bumpers, headlights, etc. Preferably these reaches are cut on angles that permit them to lie approximately coplanar with the central reaches 9 when the cover is applied to an automobile body.

Figure 2:
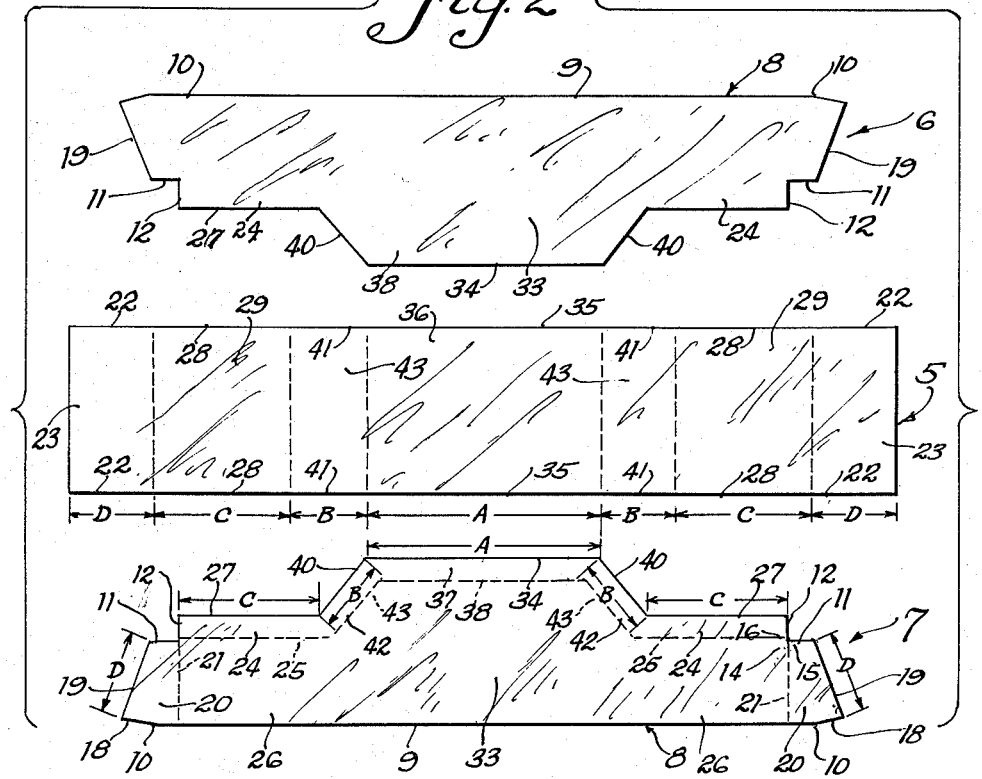
Fig. 2 is a schematic layout of the panels used in the cover structure.

Somewhat similar to the end wall-forming side panel portions 20, the side panels 6, 7 also have portions 24 that are shown approximately by lines 25 on panel 7 in Fig. 2. To form these portions the side panels 6, 7 have hood-forming portions 26 adjacent the end wall portions 20, which have edges 27 cut on straight lines extended parallel to the lines on which free edge reaches 9 are cut, and spaced from them at the same distance as the remote ends of the second pocket-forming edges 12, that is, at a distance exceeding the assumed maximum dimension of fender height by a distance substantially equal to one-half of the preselected length by which the maximum assumed dimension of overall width exceeds the width of panel 5. These edges 27 have a length of the order of the assumed maximum dimension of length of a longer decked fore or after extension of an automobile body to be covered, but the length is not at all critical and may vary considerably. For the exemplary cover, a length of forty-six inches is satisfactory.

In assembly, the edges 27 of hood-forming side panel portions 26 are secured to reaches 28 of the edges of top panel 5, which define a hood-forming top wall portion 29 of panel 5. Due to the excess width of side panel portions 26 over the assumed maximum fender height dimension, when the cover is applied to an automobile body, and with free edge central reach 9 registered with the lower fender margins, side panel portions 24 will extend over the top fender surfaces, and with portions 29 of top panel 5 will form hood part top walls that respectively will overlie a large part of the engine hood, and any rear decked extension that the automobile body may have. In case the body has the sweep type rear structure, or a very small rear trunk and the passenger enclosure extends practically to the rear body surface of the body, the material lying between lines spaced from the lower cover margins by the assumed maximum fender height dimension, and due to the excess of the combined widths of side panel hood top wall-forming portions 24 and top panel 5 over the width of the automobile body above its fenders, assures adequate coverage of the rear parts of automobile bodies of these types. Thus, although the side panels 6, 7 of Fig. 2 respectively have duplicate hood-forming sections 24, 26 at each end, which form hoods conforming generally to the shape and size of automobile body engine hoods, the hood-like structures that such sections form with top panel sections 29 will cover the rear body portions of automobile bodies of the type shown in Fig. 1, and also the more extreme sweep type of rear automobile body structures.

Between the hood portions provided by panel portions 24, 26, 29, the cover includes a central enlarged section for covering the automobile body passenger enclosure. This section comprises a top wall portion 30, end wall portions 31 and side wall portions 32. The side wall portions and parts of the top wall portion are provided by central parts of the side panels 6 and 7, including a middle part 33 that is defined between a middle part of the free edge of central reach 9 and a middle reach 34 of the opposite panel edge that is cut on a line parallel to the line on which reach 9 is cut and spaced from it a distance exceeding the assumed maximum dimension of passenger enclosure height by substantially one-half the preselected length of excess of the assumed maximum width over width of top panel 5, in the example nine inches. Conveniently the spacing of the lines on which middle edge reaches 34 and the opposite reaches 9 are cut is the width of the same strip stock that top panel 5 is cut from, fifty-four inches in the example cover.

In manufacture, reaches 34 are secured to corresponding reaches 35 of a center section 36 of top panel 5. Marginal portions 37 of the side panel portions 33, approximately defined by dotted line 38 in panel 7 of Fig. 2, overlie side parts of the automobile body top, and together with top panel portion 36 form top wall portion 30 of the cover. The length of the top wall portion 30, that is of side panel middle edge reaches 34 and top panel portion 36, is not critical. Due to the excess material over the peripheral extent of side and top surfaces of an automobile body passenger enclosure, the cover is adequately large to cover passenger enclosures even though their longitudinal extent is considerably greater than the length of top wall portion 30. For the specific cover for which exemplary dimensions are being given, a length of seventy-six inches is adequate for the indicated range of automobile body sizes, models and types.

Preferably, the middle edge reaches of side panels 6, 7 are connected with the inner ends of the hood-forming edges 27 by edge reaches 40 that are cut on straight lines angularly related to edges 27 and reaches 34. In assembly these edge reaches 40 are secured to corresponding edge portions 41 of top panel 5. Portions 42 of the side panels, generally defined by dotted lines of panel 7 in Fig. 2 form marginal portions of the center section end walls 31. When the cover is applied to an automobile body these tend to lie alongside end wall portions 43 of top panel 5.

The various edge portions at one side of top panel 5, and the corresponding edges and reaches of side panel 7 to which they are secured, are indicated by corresponding letters A to D in Fig. 2.

It is to be noted that the securing together of the pocket-forming edges 11, 12, in addition to the formation of hanger pockets for support on fender tops, tends to form the top and end wall portion-forming parts 20, 24, 37, 42 into flaps that join the edges of panel 5 in edge to edge condition and to form extended portions of the various wall portions provided by parts 23, 29, 36, 43 of top panel 5. This effect is particularly marked at the corners of the cover, closely adjacent seams 17. As indicated, the seams 17, and the pockets that they provide are so spaced apart laterally and longitudinally, and so spaced vertically from the free lower edges of the cover, that they correspond to the assumed maximum dimensions of length and width between longitudinally and laterally spaced fender surfaces, and vertical height offenders. These seams and pockets provide definite suspension points for the four corners of a lower skirt-like portion of the cover, that surrounds the body fenders and lateral and transverse outer body surfaces between them. The middle side wall portions of the cover, somewhat similarly are supported by the top and side panel portions 36, 37 that overlie the automobile passenger compartment roof. By this type of multiple suspension support, the lower margin of the cover conforms with the lower automobile body sufficiently, and the side and end wall portions of the cover drape themselves over the corresponding body surfaces with sufficient correspondence to provide a sufficiently neat fit to provide complete coverage of the body and substantial correspondence of the lower cover margins to the lower car body margins. The cover walls hang without bulky folds or wrinkles such as to preclude close fitting of the cover with any of the body sizes and types falling within the range of standard stock bodies of maximum dimensions equal to or less than the assumed maximum corresponding dimensions for which the cover is designed.

An elastic 45 is bound to the lower margin of the cover, and is of a normal length considerably shorter, say one-half that of the combined lengths of the lower automobile body of the assumed maximum dimensions selected. Preferably the various widths of the side panels 6, 7, are somewhat wider than the assumed maximum dimensions of corresponding automobile body heights, so that the elastic can draw the free cover margin inward and under the automobile body margin. It has been found that as a practical matter it is unnecessary to have the elastic 45 completely encircling the lower cover margin, and that its securement along the free edges 8 of side panels 6, 7, is sufficient for securing the cover and drawing it under the car body margin to ensure complete covering of the body. Omission of the elastic at the ends of the cover affords considerable assistance in using the cover, since it identifies the ends when the cover is collapsed. In the absence of identification, since the cover in collapsed condition is absolutely shapeless and contains a substantial area of material, it is difficult to distinguish between the sides and ends of the cover, and so is difficult to properly orient the cover relative to the body.

The somewhat extensible and extremely flexible nature of the plastic material indicated as suitable for manufacture of the covers, of course contributes an effect in causing the covers to drape properly on various automobile bodies, and is adequate to allow for such projections as fender top and rear lights, hood cover ornaments and other objects that commonly project from automobile bodies.

It is to be clearly understood that the cover herein disclosed is not intended to provide a glove-like fit for any automobile body. It is intended only to cover a large number of different sizes and types of automobile bodies with sufficient accuracy to insure complete enclosure of the body top, end and side surfaces, with suspension support, and with draping sufficiently neat to avoid such wrinkling and bunching as might preclude a tight engagement about, and preferably under, the lower margins of such bodies.

I claim:

1. A fabric article providing a flexible cover applicable to a variety of automobile bodies of different shapes and sizes having assumed maximum dimensions of fender height between lowermost margins and uppermost fender surfaces, width between outermost lateral surfaces of opposite fenders, and length between foremost and rearmost fender surfaces; said cover comprising a pair of end wall portions of a width less than said assumed maximum width dimension by a preselected length, a pair of side panels each having a free edge corresponding to the lower margin of an automobile body and of a length exceeding said assumed maximum length dimension by at least said preselected length, and each panel end having a pair of pocket-forming edges cut on lines diverging angularly from a common point spaced from said free edge a distance corresponding substantially to said assumed maximum fender height dimension, and said common points of each panel being spaced apart a distance corresponding substantially to said assumed maximum length dimension, one of each pair of pocket-forming edges extending from the common point to the adjacent end, and the other to the edge opposite said free edge of said panel, and said pairs of pocket-forming edges being secured together, thereby forming pockets for hanging support on the fender tops of an automobile body, the end edges of said side panels being secured to the edges of said end wall portions, and between said pockets, said cover including top wall and side panel structure for enclosing the top and side surfaces of an automobile body on the fender tops of which said pockets are supported.

2. A fabric article providing a flexible cover applicable to a variety of automobile bodies of different shapes and sizes having assumed maximum dimensions of fender height between lowermost margins and uppermost fender surfaces, width between outermost lateral surfaces of opposite fenders, and length between foremost and rearmost fender surfaces; said cover comprising a pair of end wall portions of a width less than said assumed maximum width dimension by a preselected length, a pair of side panels each having a free edge including a central reach cut on a straight line and of an assumed maximum length exceeding said length dimension substantially by said preselected length, and a pair of end reaches respectively cut on lines extended outward beyond the opposite ends of said central reach, each of said side panels having at each of its ends a first pocket-forming edge of a length corresponding substantially to one-half said preselected length and cut on a line extended parallel to the line on which said free edge central reach is cut and spaced therefrom a distance corresponding substantially to said fender assumed maximum height dimension, and said first pocket-forming edges having inner ends spaced apart a distance corresponding substantially to said assumed maximum length dimension, said panels having end edges connecting the outer ends of said pocket-forming edges and the ends of said end reaches of the free edge, and said panel also having at its respective ends second pocket-forming edges equal in length to said first pocket-forming edges and cut on lines extended at right angles to the first pocket-forming edges, from their said inner ends away from said free edge, said first and second pocket-forming edges at the respective ends of said panels being secured together, said panel end edges being secured to edges of said end wall portions, and said cover including side and top wall structure between said panel ends and end wall portions for enclosing side and top surfaces of an automobile body.

3. A fabric article providing a flexible cover applicable to a variety of automobile bodies of different shapes and sizes having assumed maximum dimensions of fender height between lowermost margins and uppermost fender surfaces, width between outermost lateral surfaces of opposite fenders, a first length between foremost and rearmost fender surfaces, and a second length of a decked forward or rear extension from the passenger enclosure; said cover comprising a top panel of sufficient length to extend over the top of an automobile body to be covered and between the front and rear lower margins thereof and of a width less than said assumed maximum width dimension by a preselected length, a pair of side panels each having a free edge including a central reach cut on a straight line and of a length exceeding said first assumed maximum length dimension substantially by said preselected length, and a pair of end reaches respectively cut on lines extended outward beyond the opposite ends of said central reach, each of said side panels having at each of its ends a first pocket-forming edge of a length corresponding substantially to one-half said preselected length and cut on a line extended parallel to the line on which said free edge central reach is cut and spaced therefrom a distance corresponding substantially to said assumed maximum fender height dimension, and said first pocket-forming edges having inner ends spaced apart a distance corresponding substantially to said first assumed maximum length dimension and from which said edges extend outward, said panels having end edges connecting the outer ends of said pocket-forming edges and the ends of said end reaches of said free edge, said side panels also having at their respective ends second pocket-forming edges equal in length to said first pocket-forming edges and cut on lines extended at right angles to the first pocket-forming edges, from the said inner ends of the latter and away from said free edge, said first and second pocket edges at the respective panel ends being secured together, said side panels having hood-forming edges of a length of the order of said second assumed maximum length dimension and cut on lines extended from the outer ends of said second pocket-forming edges and parallel to the line on which said central free edge reach is cut, said end and hood-forming side panel edges being secured to edges of portions of said top panel and said cover including structure between said top panel portions and said hood-forming side panel edges for enclosing the passenger compartment structure of an automobile body.

4. A fabric article providing a flexible cover applicable to a variety of automobile bodies of different shapes and sizes having assumed maximum dimensions of overall length and width, passenger enclosure height, fender height, and height and length of a decked fore or after extension from the passenger enclosure; said cover comprising a pair of hood sections of height, length and width respectively conforming substantially with said maximum assumed dimensions of fender height, extension length and overall width, and each including side walls, a top wall and an end wall joining one another and forming corner pockets for hanging support on laterally opposite automobile outer and upper fender corners; and said cover also including side wall reaches joining said hood section sidewalls and spacing their outer ends in substantial correspondence to said assumed maximum dimension of overall length, said sidewall reaches having portions wider than said hood sections, projecting beyond said top walls and having a width corresponding substantially with said assumed maximum dimension of passenger enclosure height, and joined top and end wall portions having opposite edges joining the opposite edges of said side wall portions and the inner ends of said hood section top walls.

5. An automobile cover including a skirt for surrounding the lower portion and fenders of an automobile body and for hanging suspension from the tops of the latter; said skirt comprising side panel portions having free lower edges, forward and rear end flaps at the respective ends and edge flap portions adjacent the respective ends of the upper edges of said side panel portions, adjacent pairs of said edge flap portions and flaps having adjacent edges cut along diverging lines and joined together to form pockets each bounded on three sides by areas of said side panel and upper edge flap portions and end flaps which are respectively disposed to overlie the outer side, top and end surfaces of a fender; a pair of end panel portions respectively joined to the edges of the different corresponding pairs of end flaps; and a top panel portion joined to the edges of said edge flap portion.

References Cited in the file of this patent

UNITED STATES PATENTS

| | | |
|---|---|---|
| 1,719,055 | Herzer | July 2, 1929 |
| 1,918,423 | Persinger | July 18, 1933 |
| 2,243,981 | Rowan | June 3, 1941 |
| 2,570,533 | Elliott | Oct. 9, 1951 |